United States Patent
Tachibana et al.

(10) Patent No.: US 10,125,714 B2
(45) Date of Patent: Nov. 13, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Rintarou Tachibana, Toyota (JP); Tooru Suda, Toyota (JP); Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/409,390

(22) Filed: Jan. 18, 2017

(65) Prior Publication Data
US 2017/0211503 A1 Jul. 27, 2017

(30) Foreign Application Priority Data
Jan. 27, 2016 (JP) .................................. 2016-013823

(51) Int. Cl.
*F02D 41/14* (2006.01)
*F02D 41/34* (2006.01)
(Continued)

(52) U.S. Cl.
CPC ......... *F02D 41/34* (2013.01); *F02D 41/3094* (2013.01); *F02D 2041/1412* (2013.01);
(Continued)

(58) Field of Classification Search
CPC .... F02D 41/34; F02D 41/009; F02D 41/1401; F02D 41/3094; F02D 41/1412;
(Continued)

(56) References Cited

U.S. PATENT DOCUMENTS

| | | | |
|---|---|---|---|
| 6,901,791 B1 * | 6/2005 | Frenz | F02D 41/221 73/114.41 |
| 2006/0259227 A1 * | 11/2006 | Fritsch | F02D 41/2422 701/104 |

(Continued)

FOREIGN PATENT DOCUMENTS

| | | |
|---|---|---|
| JP | 2012-237274 A | 12/2012 |
| JP | 2014-190180 A | 10/2014 |
| JP | 2014-190186 A | 10/2014 |

OTHER PUBLICATIONS

U.S. Appl. No. 15/409,365, filed Jan. 18, 2017 in the name of Rintarou Tachibana et al.

*Primary Examiner* — Lindsay Low
*Assistant Examiner* — George Jin
(74) *Attorney, Agent, or Firm* — Oliff PLC

(57) ABSTRACT

A control device for an internal combustion engine is equipped with an electronic control unit. The electronic control unit is configured to: i) calculate amplitudes of respective waves, respectively, originating from a plurality of factors that causes fuel pressure pulsation within a low-pressure fuel passage, vibration frequencies of the respective waves within a crank angle range of 360 degrees, initial phases of the respective waves, and central fuel pressure values of the respective waves; and ii) predict a fuel pressure value at an arbitrary crank angle according to a model formula showing a synthesized wave obtained by synthesizing the respective waves, on a basis of the amplitudes, the vibration frequencies, the initial phases, and the central fuel pressure values of the respective waves calculated.

5 Claims, 6 Drawing Sheets

(51) Int. Cl.
   *F02D 41/30*      (2006.01)
   *F02D 41/38*      (2006.01)
   *F02M 63/02*      (2006.01)

(52) U.S. Cl.
   CPC .............. *F02D 2041/389* (2013.01); *F02D 2041/3881* (2013.01); *F02D 2200/0602* (2013.01); *F02D 2200/0604* (2013.01); *F02D 2200/101* (2013.01); *F02D 2250/04* (2013.01); *F02M 63/029* (2013.01); *Y02T 10/44* (2013.01)

(58) Field of Classification Search
   CPC .... F02D 41/3836; F02D 41/345; F02D 41/36; F02D 41/365; F02D 2041/1412; F02D 2041/389; F02D 2041/1409; F02D 2041/288
   See application file for complete search history.

(56) References Cited

U.S. PATENT DOCUMENTS

2012/0020384 A1* 1/2012 Mikami .............. F02D 41/3836
                                              374/144
2017/0211501 A1* 7/2017 Tachibana ........... F02D 41/3094
2017/0211502 A1* 7/2017 Tachibana ............... F02D 41/32

\* cited by examiner

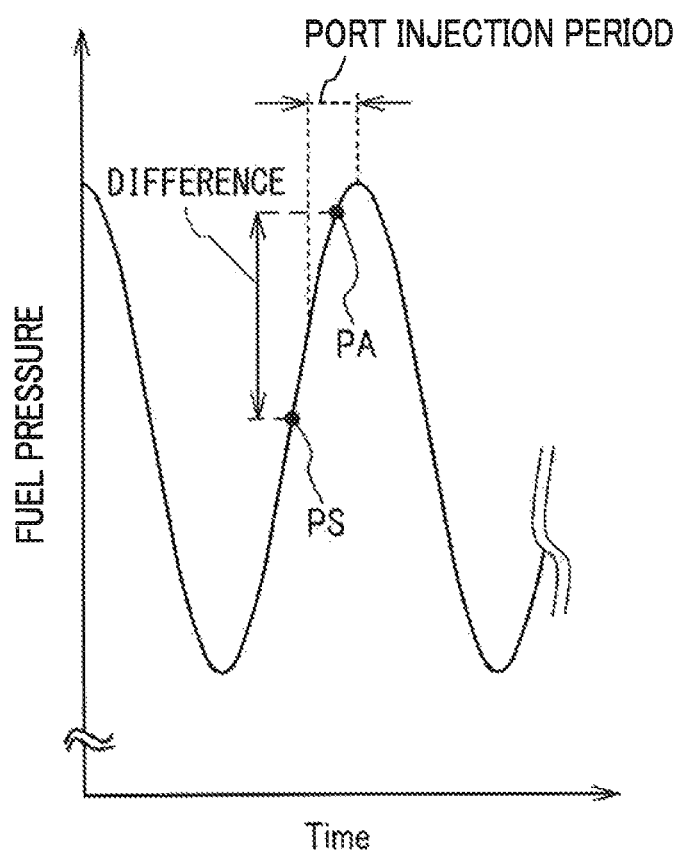

CONTROL DEVICE FOR INTERNAL COMBUSTION ENGINE

INCORPORATION BY REFERENCE

The disclosure of Japanese Patent Application No. 2016-013823 filed on Jan. 27, 2016 including the specification, drawings and abstract is incorporated herein by reference in its entirety.

BACKGROUND

1. Technical Field

The present disclosure relates to a control device for an internal combustion engine.

2. Description of Related Art

Internal combustion engines having in-cylinder injection valves and in-cylinder port injection valves are known. In such internal combustion engines, fuel pumped up by a low-pressure pump is supplied to the port injection valves via a low-pressure fuel passage, and fuel further pressurized by a high-pressure pump is supplied to the in-cylinder injection valves via a high-pressure fuel passage. In such a configuration, a fuel pressure sensor that detects the fuel pressure within the low-pressure fuel passage may be provided. A detection value of such a fuel pressure sensor may be used for control of various control targets, for example, fuel injection amounts from the port injection valves.

In such a configuration, the fuel pressure may pulsate within the low-pressure fuel passage. Since the fuel pressure pulsation occurs on the basis of a plurality of factors, complicated behaviors may be shown. In a case where such fuel pressure pulsation occurs, the fuel injection amounts may be appropriately uncontrollable if the fuel injection amounts of the port injection valves are controlled on the basis of the detection value of the fuel pressure sensor.

In contrast, a technique of appropriately controlling the fuel injection amounts of the port injection valves on the basis of a map in which correction values of port injection amounts are defined in advance for every rotating speed of an internal combustion engine in consideration of pulsation, without using an actual fuel pressure value, is described in, for example, Japanese Patent Application Publication No. 2012-237274 (JP 2012-237274 A).

SUMMARY

However, as described, the pulsation of the fuel pressure occurs due to a plurality of factors. For this reason, since only one factor called the rotating speed of an internal combustion engine is taken into consideration in the technique of JP 2012-237274A, the fuel injection amount that is a control target may be appropriately uncontrollable.

Thus, the present disclosure provides a control device for an internal combustion engine that predicts a fuel pressure value in consideration of a plurality of factors of fuel pressure pulsation.

The present disclosure provides a control device for an internal combustion engine. The control device includes an in-cylinder injection valve configured to directly inject fuel into a cylinder of the internal combustion engine; a port injection valve configured to inject fuel into an intake port of the internal combustion engine; a low-pressure pump configured to pressurize fuel; a low-pressure fuel passage configured to supply the fuel pressurized by the low-pressure pump to a plurality of the port injection valves; a high-pressure pump configured to be driven in an interlocking manner with the internal combustion engine and further pressurize the fuel supplied from the low-pressure fuel passage; a high-pressure fuel passage configured to branch from the low-pressure fuel passage and supply the fuel pressurized by the high-pressure pump to a plurality of the in-cylinder injection valves; a crank angle sensor configured to detect a crank angle of the internal combustion engine; a calculation unit configured to calculate amplitudes of respective waves, respectively, originating from a plurality of factors that generate fuel pressure pulsation within the low-pressure fuel passage, vibration frequencies of the respective waves within a crank angle range of 360 degrees, initial phases of the respective waves, and central fuel pressure values of the respective waves, and a prediction unit configured to predict a fuel pressure value at an arbitrary crank angle according to following model formula (1) showing a synthesized wave obtained by synthesizing the respective waves, on a basis of the amplitudes, the vibration frequencies, the initial phases, and the central fuel pressure values of the respective waves calculated.

$$P(\theta) = \sum_{k=1}^{n} A_k \cos\{B_k(\theta - C_k)\} + D_k \qquad (1)$$

Here, P is a fuel pressure value of the synthesized wave corresponding to the crank angle, $\theta$ is the crank angle, $A_K$ is the amplitudes of the respective waves, $B_k$ is the vibration frequencies of the respective waves within the crank angle range of 360 degrees, $C_k$ is the initial phases of the respective waves, $D_k$ is the central fuel pressure values of the respective waves. The aspect of the present disclosure can also be defined as follows. The present disclosure provides a control device for an internal combustion engine. The control device includes an in-cylinder injection valve configured to directly inject fuel into a cylinder of the internal combustion engine; a port injection valve configured to inject fuel into an intake port of the internal combustion engine; a low-pressure pump configured to pressurize fuel; a low-pressure fuel passage configured to supply the fuel pressurized by the low-pressure pump to a plurality of the port injection valves; a high-pressure pump configured to be driven in an interlocking manner with the internal combustion engine and further pressurize the fuel supplied from the low-pressure fuel passage; a high-pressure fuel passage configured to branch from the low-pressure fuel passage and supply the fuel pressurized by the high-pressure pump to a plurality of the in-cylinder injection valves; a crank angle sensor configured to detect a crank angle of the internal combustion engine; and an electronic control unit configured to i) calculate amplitudes of respective waves, respectively, originating from a plurality of factors that generate fuel pressure pulsation within the low-pressure fuel passage, vibration frequencies of the respective waves within a crank angle range of 360 degrees, initial phases of the respective waves, and central fuel pressure values of the respective waves, and ii) predict a fuel pressure value at an arbitrary crank angle according to model formula (1) showing a synthesized wave obtained by synthesizing the respective waves, on the basis of the amplitudes, the vibration frequencies, the initial phases, and the central fuel pressure values of the respective waves calculated, where $A_K$ is the amplitudes of the respective waves, $B_k$ is the vibration frequencies of the respective waves with a crank angle $\theta$ being 360 degrees, $C_k$ is the initial phases of the respective waves, $D_k$ s the central fuel pressure values of the respective waves, and P(θ) is a fuel pressure value of the synthesized wave.

Since the above model formula (1) shows the synthesized wave of the respective waves originating from the plurality of factors of the fuel pressure pulsation, the fuel pressure value can be predicted in consideration of the plurality of factors of the fuel pressure pulsation.

The calculation unit may be configured to calculate the amplitudes, the vibration frequencies, the initial phases, and the central fuel pressure values of respective waves, respectively, originating from the high-pressure pump, the low-pressure pump and the port injection valves.

The calculation unit may be configured to perform calculation such that the amplitude of the wave originating from the low-pressure pump increases as a rotating speed of the low-pressure pump increases, to calculate, as a vibration frequency of the wave originating from the low-pressure pump, a value obtained by multiplying a ratio of the rotating speed of the low-pressure pump to the rotating speed of the internal combustion engine by a periodic number of a duty signal of a driving voltage of the low-pressure pump required for rotating the low-pressure pump, and to calculate the initial phase of the wave originating from the low-pressure pump on a basis of a crank angle at a timing when the driving voltage of the low-pressure pump is switched from on-duty to off-duty first after the crank angle reaches zero.

The calculation unit may be configured to perform calculation such that the amplitude of the wave originating from the port injection valve increases as an energization period of the port injection valve from which fuel is most recently injected is long, and to calculate an initial phase of the wave originating from the port injection valve, on a basis of a crank angle at a injection start timing of the port injection valve.

The calculation unit may be configured to calculate the central fuel pressure values originating from the high-pressure pump and the port injection valve, respectively, as zero, and to calculate the central fuel pressure value of a wave originating from the low-pressure pump, on a basis of any of a rotating speed of the low-pressure pump, an averaging value of a detection value of a fuel pressure sensor that detects a fuel pressure value within the low-pressure fuel passage, and a target fuel pressure value that is a target value of the fuel pressure value within the low-pressure fuel passage.

An energization period calculation unit configured to calculate an energization period of the port injection valve on a basis of the predicted fuel pressure value such that the port injection valve perform injection by a required injection amount may be included.

According to the present disclosure, the control device for an internal combustion engine that predicts the fuel pressure value in consideration of the plurality of factors of the fuel pressure pulsation can be provided.

BRIEF DESCRIPTION OF THE DRAWINGS

Features and advantages, and technical and industrial significance of exemplary embodiments of the present disclosure will be described below with reference to the accompanying drawings, in which like numerals denote like elements, and wherein:

FIG. 3 is a graph illustrating an example of a waveform of fuel pressure pulsation and an injection period of a port injection valve.

DETAILED DESCRIPTION OF EMBODIMENTS

Figure 1:
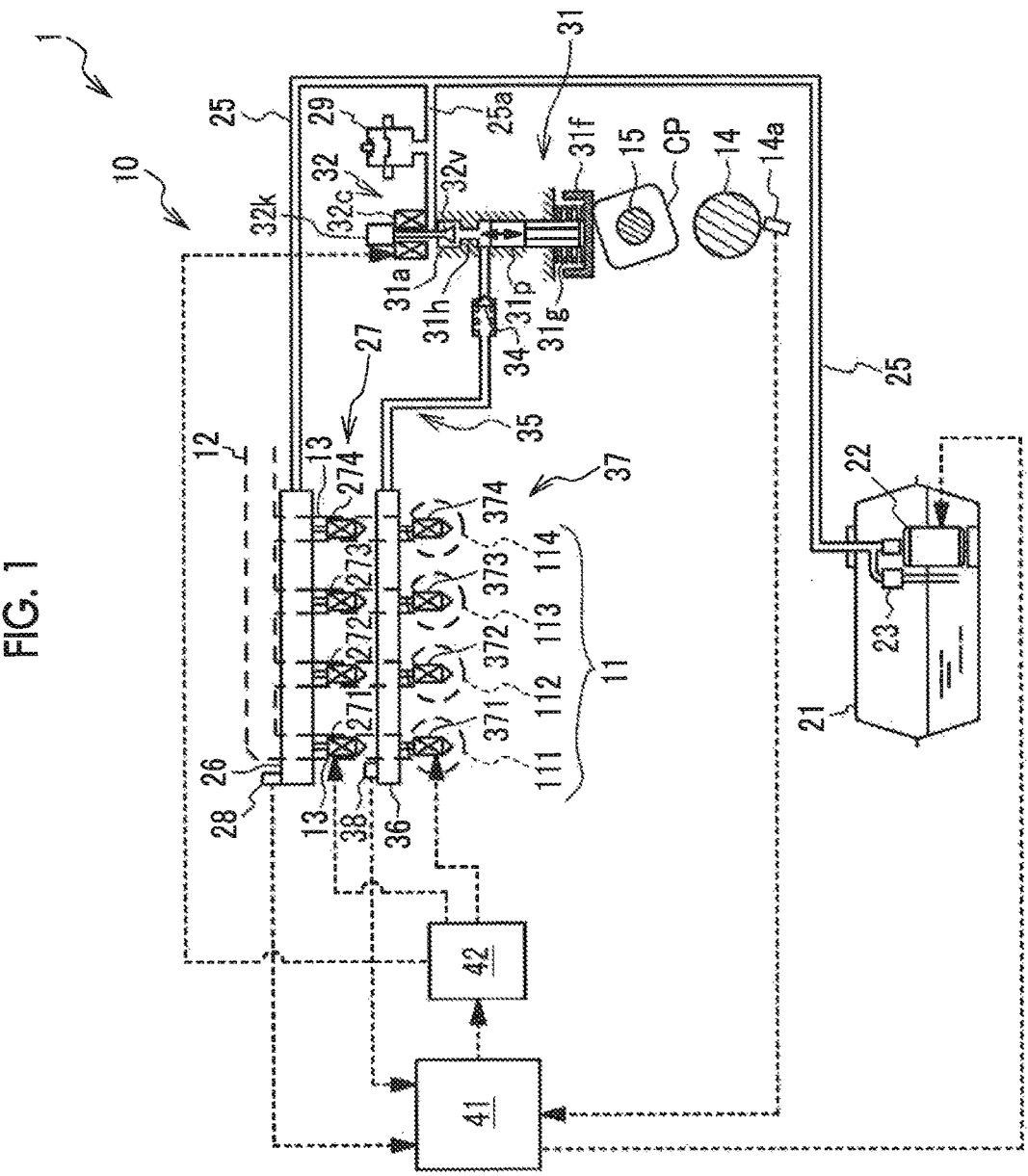
FIG. 1 is a schematic block diagram of a control device of the present embodiment.

Hereafter, embodiments of the present disclosure will be described referring to the drawings.

FIG. 1 is a schematic block diagram of a control device 1 of the present embodiment. The control device 1 includes an engine 10, and an electronic control unit (ECU) 41 that controls the engine 10. The engine 10 is a spark ignition type in-line four-cylinder engine equipped with a cylinder group 11 including cylinders 111 to 114 arranged in series, an in-cylinder injection valve group 37, and a port injection valve group 27. The engine 10 is an example of an internal combustion engine. The control device 1 is an example of a control device for an internal combustion engine.

The in-cylinder injection valve group 37 includes in-cylinder injection valves 371 to 374 that inject fuel into the cylinders 111 to 114, respectively. The port injection valve group 27 includes port injection valves 271 to 274 that inject fuel into intake ports 13, respectively, which communicate with the cylinders 111 to 114. Each of the in-cylinder injection valve group 37 and the port injection valve group 27 is an electromagnetic driving type on-off valve of which the fuel injection amount is adjusted by energizing a magnet coil in a predetermined energization period, thereby spacing a valve body apart from a valve seat.

An intake passage 12 having a plurality of intake ports 13 corresponding to the respective cylinders of the cylinder group 11, and an exhaust passage having a plurality of exhaust ports (not illustrated) are formed in the engine 10. In the respective cylinders of the cylinder group 11, pistons (not illustrated) are housed and combustion chambers are demarcated. Each combustion chamber is opened and closed by an intake valve and an exhaust valve. Moreover, the engine 10 is equipped with ignition plugs (not illustrated). Additionally, the engine 10 is equipped with a crankshaft 14 interlocked with a plurality of pistons, and a cam shaft 15 that is interlocked with the crankshaft 14 and drives the intake valves or the exhaust valves. Additionally, a crank angle sensor 14a that detects the rotational angle of the crankshaft 14 is provided. Although it is preferable that the resolution power of crank angle detection by the crank angle sensor 14a is, for example, a high resolution power of about 1 degree, the present disclosure is not limited to this.

Additionally, the control device 1 includes a fuel tank 21, a low-pressure pump 22, a pressure regulator 23, a low-pressure fuel line 25, a low-pressure delivery pipe 26, and a fuel pressure sensor 28.

Gasoline that is fuel is stored in the fuel tank 21. The low-pressure pump 22 is equipped with an electric motor, and the discharge amount of fuel from the low-pressure pump 22 into the low-pressure fuel line 25 is controlled by a driving voltage to the electric motor being duty-controlled. The pressure regulator 23 regulates the pressure of fuel to be discharged into the low-pressure fuel line 25 to a preset supply pressure on a low-pressure side.

The low-pressure fuel line 25 and the low-pressure delivery pipe 26 are an example of a low-pressure fuel passage that allows the fuel discharged from the low-pressure pump 22 to be supplied to the port injection valve group 27 therethrough. The fuel that is pressurized to a predetermined pressure level by the low-pressure pump 22 and regulated in pressure to the supply pressure on the low-pressure side by the pressure regulator 23 is introduced into the low-pressure delivery pipe 26 via the low-pressure fuel line 25.

The port injection valve group 27 is connected to the low-pressure delivery pipe 26, and injects fuel into the intake ports 13 corresponding to the respective cylinders the cylinder group 11. Although the fuel pressure sensor 28 will be described below in detail, the fuel pressure sensor detects a fuel pressure value within the low-pressure delivery pipe 26. A detection value of the fuel pressure sensor 28 is acquired by the ECU 41 at regular sampling time intervals.

Additionally, the control device 1 includes a high-pressure pump 31, a high-pressure fuel pipe 35, a high-pressure delivery pipe 36, and a fuel pressure sensor 38.

The high-pressure pump 31 suctions fuel from a branch line 25a branching from the low-pressure fuel line 25, and pressurizes the fuel to a high-pressure level higher than a supply pressure level from the low-pressure pump 22. A pulsation damper 29 that suppresses fuel pressure pulsation within the branch line 25a is connected to the branch line 25a.

The high-pressure pump 31 includes, specifically, a pump housing 31h, a plunger 31p that is slidable within the pump housing 31h, and a pressurizing chamber 31a demarcated between the pump housing 31h and the plunger 31p. The volume of the pressurizing chamber 31a varies according to displacement of the plunger 31p. The fuel pressurized by the low-pressure pump 22 is introduced into the pressurizing chamber 31a via the branch line 25a in a state an electromagnetic valve 32 to be described below is opened. The fuel within the pressurizing chamber 31a is pressurized to high pressure by the plunger 31p, and is discharged into the high-pressure fuel pipe 35.

A cam CP that drives the plunger 31p is mounted on the cam shaft 15 of the engine 10. The shape of the cam CP is a substantially square shape of which corners are rounded off. Additionally, the high-pressure pump 31 has a follower lifter 31f that is moved up and down by the cam CP, and a spring 31g that biases the follower lifter 31f to the cam CP side. The plunger 31p is interlocked with the follower lifter 31f, and the plunger 31p also moves up and down together with the follower lifter 31f. The cam shaft 15 is interlocked with the crankshaft 14 via a chain or a belt. The cam shaft 15 and the cam CP are driven at a rotating speed of ½ of the rotating speed of the crankshaft 14.

The electromagnetic valve 32 is provided in an fuel inlet part of the pressurizing chamber 31a of the high-pressure pump 31. The electromagnetic valve 32 has a valve body 32v, a coil 32c that drives the valve body 32v, and a spring 32k that always biases the valve body 32v in an opening direction. Energization to the coil 32c is controlled via a driver circuit 42 by the ECU 41. If the coil 32c is energized, the valve body 32v cuts off the branch line 25a of the low-pressure fuel line 25 and the pressurizing chamber 31a against a biasing force of the spring 32k. The valve body 32v is maintained in an open state by the biasing force of the spring 32k in a state where the coil 32c is not energized.

A check valve 34 with a spring is provided in the high-pressure fuel pipe 35 between the high-pressure delivery pipe 36 and the pressurizing chamber 31a. The check valve 34 is opened when the fuel pressure on the pressurizing chamber 31a side becomes higher by a predetermined pressure than the fuel pressure the high-pressure delivery pipe 36 side.

In a suction stroke of the high-pressure pump 31, the electromagnetic valve 32 is opened, the plunger 31p moves down, and fuel is charged into the pressurizing chamber 31a from the branch line 25a of the low-pressure fuel line 25. In a pressurization stroke, the electromagnetic valve 32 is closed, the volume of the pressurizing chamber 31a decreases with the upward movement of the plunger 31p, and the pressure of fuel within the pressurizing chamber 31a is raised. In a discharge stroke, when a force originating from the fuel pressure within the pressurizing chamber 31a becomes larger than the biasing force of the spring of the check valve 34, the check valve 34 is opened, and the pressure-raised fuel is supplied to the high-pressure fuel pipe 35 and the high-pressure delivery pipe 36. As described above, the upward and downward movement of the plunger 31p is realized by the rotation of cam CP, and the cam CP is interlocked with the crankshaft 14 via the cam shaft 15. Therefore, the high-pressure pump 31 is driven in an interlocking manner with the crankshaft 14.

In addition, although the electromagnetic valve 32 is brought into an open state with non-energization here, the present disclosure is not limited to this. For example, the electromagnetic valve 32 may reverse the biasing directions of the coil 32c and the spring 32k, respectively, and may be brought into a closed state with non-energization. In this case, the coil 32c is energized in the suction stroke of fuel, and is not energized in the pressurization and discharge strokes.

The high-pressure fuel pressurized by the high-pressure pump 31 is accumulated the high-pressure delivery pipe 36 via the high-pressure fuel pipe 35. The high-pressure fuel pipe 35 and the high-pressure delivery pipe 36 are an example of the high-pressure fuel passage that allows the high-pressure fuel to be supplied from the high-pressure pump 31 to the in-cylinder injection valves 371 to 374 therethrough.

The in-cylinder injection valve group 37 directly injects the high-pressure fuel in given order inside from the inside of the high-pressure delivery pipe 36 to the inside of each of the cylinders 111 to 114. The fuel pressure sensor 38 detects the fuel pressure within the high-pressure delivery pipe 36, and the detection value of the fuel pressure sensor 38 is acquired by the ECU 41 at regular sampling time intervals.

The ECU 41 includes a central processing unit (CPU), a read-only memory (ROM), and a random access memory (RAM). The ECU 41 executes the port injection control to be described below on the basis of information from sensors, information stored in advance in the ROM, or the like according to a control program stored in advance within the ROM. This control is executed by a calculation unit, a prediction unit, and an energization period calculation unit that are functionally realized by the CPU, the ROM, and the RAM. This control will be described below in detail.

The ECU 41 calculates the required injection amounts of fuel required for the respective port injection valves of the port injection valve group 27 on the basis of the operational state of an engine 10. Moreover, the ECU 41 calculates respective energization periods to the port injection valve group 27 corresponding to the required injection amounts, and the respective port injection valves of the port injection valve group 27 are energized during the calculated energization periods in predetermined order at predetermined crank angle intervals. Accordingly, port injection is realized by injection amounts corresponding to the required injection amounts. This is also the same in the in-cylinder injection valve group 37.

A valve-opening period of each of these fuel injection valves is proportional to an energization period to the magnet coil of the fuel injection valve. Therefore, the ECU 41 calculates the respective energization periods of the port injection valve group 27 according to the required injection amounts by a method to be described below. Additionally the ECU 41 calculates the respective energization periods of the in-cylinder injection valve group 37 according to the required injection amounts on the basis of the detection value of the fuel pressure sensor 38. The ECU 41 issues a command to the driver circuit 42 according to the calculated energization periods. The driver circuit 42 energizes the respective valves of the port injection valve group 27 and the in-cylinder injection valve group 37 during the calculated energization periods, according to the command from the ECU 41. In this way, the fuel injection amounts of the respective fuel injection valves are controlled.

Figure 2:
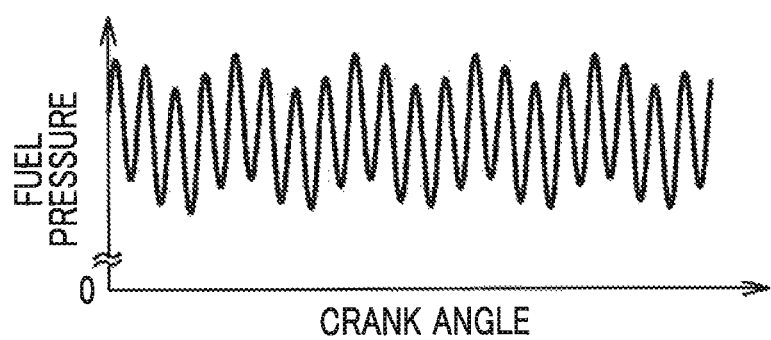
FIG. 2 is a waveform chart of fuel pressure.

Next, the fuel pressure pulsation generated within the low-pressure fuel line 25 and the low-pressure delivery pipe 26 will be described. FIG. 2 is a waveform chart of the fuel pressure. A vertical axis represents the fuel pressure and a horizontal axis represents the crank angle. Although the amplitude, cycle, and the like of the fuel pressure pulsation vary according to conditions, such as engine speed, such pulsation occurs in a wide engine speed zone.

As the reason why the fuel pressure pulsation occurs, a plurality of factors are considered, for example, the high-pressure pump 31, the port injection valve group 27, and the low-pressure pump 22 are considered to be factors. The pulsation originating from the high-pressure pump 31 occurs as follows, for example. In a case where the in-cylinder injection valve group 37 is not used but fuel injection using the port injection valve group 27 is executed, the plunger 31p repeats upward and downward movement, the electromagnetic valve 32 while being maintained in the open state. For this reason, intake and discharge of fuel are repeated between the low-pressure fuel line 25 and the pressurizing chamber 31a, and accordingly, pulsation occurs. Additionally, since the fuel pressure within the low-pressure fuel line 25 and the low-pressure delivery pipe 26 drops whenever the fuel injection is executed for any valve of the port injection valve group 27, the pulsation originating from the port injection valve group 27 occurs. Additionally, since the low-pressure pump 22 is always driven irrespective of the presence/absence of execution of the port injection, the pulsation originating from the low-pressure pump 22 occurs due to intake and discharge of fuel from the fuel tank 21. The fuel pressure pulsation occurs according to such a plurality of factors. In addition, the factors that cause the fuel pressure pulsation are not limited to the above example, and have only to be a mechanism in which the fuel within the low-pressure fuel line 25 and the low-pressure delivery pipe 26 flows due to driving and the fuel pressure within the low-pressure fuel line 25 and the low-pressure delivery pipe 26 is periodically fluctuated.

FIG. 3 is a graph illustrating the waveform of the fuel pressure pulsation, and an example of an energization period of a port injection valve. A vertical axis represents the fuel pressure and a horizontal axis represents time. Here, a fuel pressure value PA is an actual fuel pressure value during energization, that is, during a port injection period, and a detection value PS is a detection value of the fuel pressure sensor 28 acquired by the ECU 41. Generally, the energization period of the port injection is calculated on the basis of the detection value PS acquired before the start of the port injection, and a port injection amount is controlled. This is because the ECU 41 needs to complete the calculation of the energization period on the basis of the acquired detection value of the fuel pressure sensor 28 before the port injection reaches its start timing. Additionally, this is because the ECU 41 can acquire the detection value of the fuel pressure sensor 28 only at regular sampling time intervals. However, since the fuel pressure fluctuates in a short time due to the fuel pressure pulsation and fluctuates even during injection, a difference between the detection value PS and the fuel pressure value PA may become large as illustrated in FIG. 3. For this reason, if the energization period is calculated on the basis of the detection value PS, the port injection amount may not be precisely controlled.

In the present embodiment, the ECU 41 predicts the fuel pressure value on the basis of a model formula of the fuel pressure pulsation in consideration of the plurality of factors of pulsation. Accordingly, even in a case where the fuel pressure pulsation is complicated, the injection amount of each valve of the port injection valve group 27 can be precisely controlled. In addition, in the present embodiment, a case where the port injection amount is controlled on the basis of the predicted fuel pressure value will be described. However, a control target to be controlled on the basis of the predicted fuel pressure value is not limited to this. For example, the ignition timing of an ignition plug, or the like may be controlled on the basis of the predicted fuel pressure value. Hereinafter, the model formula will be described.

As described above, the fuel pressure pulsation occurs due to the plurality of factors. Here, a synthesized wave obtained by synthesizing respective waves originating from the plurality of factors is considered to become a wave of the fuel pressure pulsation that finally occurs within the low-pressure fuel line 25 and the low-pressure delivery pipe 26. Therefore, the ECU 41 calculates the waves originating from the respective factors, and predicts the fuel pressure value on the basis of model formula (2) showing the synthesized wave obtained by synthesizing the calculated waves.

$$P(\theta) = \sum_{k=1}^{n} A_k \cos\{B_k(\theta - C_k)\} + D_k \qquad (2)$$

θ represents the crank angle [deg], $A_k$ represents amplitudes [kPa] of the respective waves, $B_k$ represents vibration frequencies [-] of the respective waves within a crank angle range of 360 degrees, $C_k$ represents initial phases [deg] of the respective waves, $D_k$ represents central fuel pressure values [kPa] of the respective waves, and P(θ) represents a fuel pressure value [kPa] of the synthesized wave. The central fuel pressure values of the respective waves are central values of the amplitudes of the waves. The initial phases $C_k$ are crank angles when the crank angle θ are the closest to zero degree, and the amplitudes $A_k$ take maximum values. In addition, when the crank angle θ reaches zero degree, the piston of the cylinder 111 is located at a top dead center of a compression stroke.

Figure 4A:
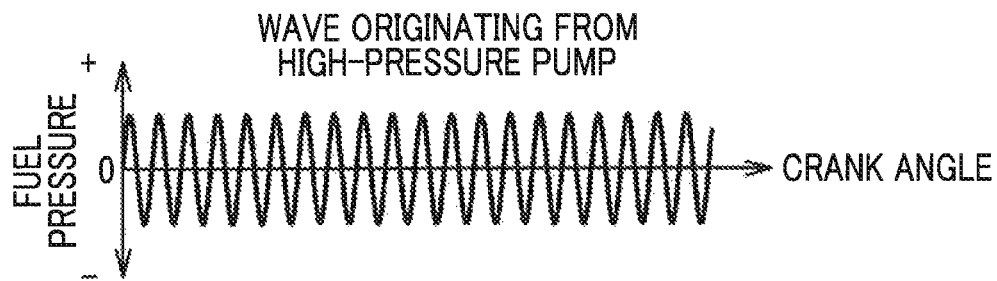
FIGS. 4A to 4C are views illustrating examples of waves originating from a high-pressure pump, a low-pressure pump, and a port injection valve group, respectively.
Figure 4B:
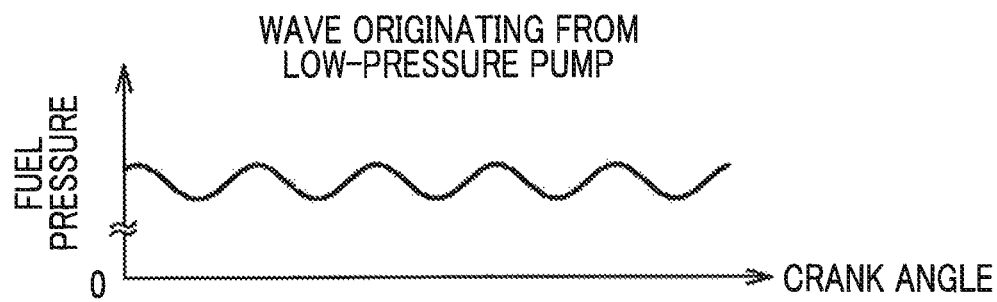
Figure 4C:
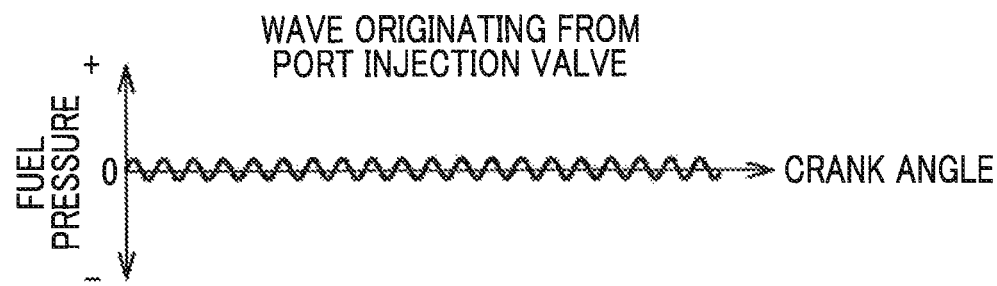

The ECU 41 calculates the amplitudes $A_k$, the vibration frequencies $B_k$, the initial phases $C_k$, and the central fuel pressure values $D_k$ of the respective waves originating from such a plurality of factors, and predicts a fuel pressure value $P(\theta)$ of pulsation according to the crank angle $\theta$. In the present embodiment, description will be made assuming that the plurality of factors of the pulsation are the high-pressure pump 31, the low-pressure pump 22, and the port injection valve group 27. Assuming that the pulsation occurs due to such three factors, a pulsation illustrated in FIG. 2 is equivalent to a synthesized wave of waves originating from respective factors illustrated in FIGS. 4A to 4C, respectively. FIGS. 4A to 4C are views illustrating the examples of the waves originating from the high-pressure pump 31, the low-pressure pump 22, and the port injection valve group 27, respectively. If the respective factors are taken into consideration, the above model formula (2) can be expressed as following model formula (3).

$$P(\theta) = A_1\cos\{B_1(\theta - C_1)\} + D_1 + \\ A_2\cos\{B_2(\theta - C_2)\} + D_2 + A_3\cos\{B_3(\theta - C_3)\} + D_3 \quad (3)$$

$A_1$ to $A_3$ are respectively the amplitudes of the waves originating from the high-pressure pump 31, the low-pressure pump 22, and the port injection valve group 27. $B_1$ to $B_3$ are respectively the vibration frequencies of the waves originating from the high-pressure pump 31, the low-pressure pump 22, and the port injection valve group 27. $C_1$ to $C_3$ are respectively the initial phases of the waves originating from the high-pressure pump 31, the low-pressure pump 22, and the port injection valve group 27. $D_1$ to $D_3$ are respectively the central fuel pressure values of the waves originating from the high-pressure pump 31, the low-pressure pump 22, and the port injection valve group 27, respectively,. The amplitudes $A_1$ to $A_3$, the vibration frequencies $B_1$ to $B_3$, the initial phases $C_1$ to $C_3$, and the central fuel pressure values $D_1$ to $D_3$ are calculated by the ECU 41. This will be described below.

Figure 5:
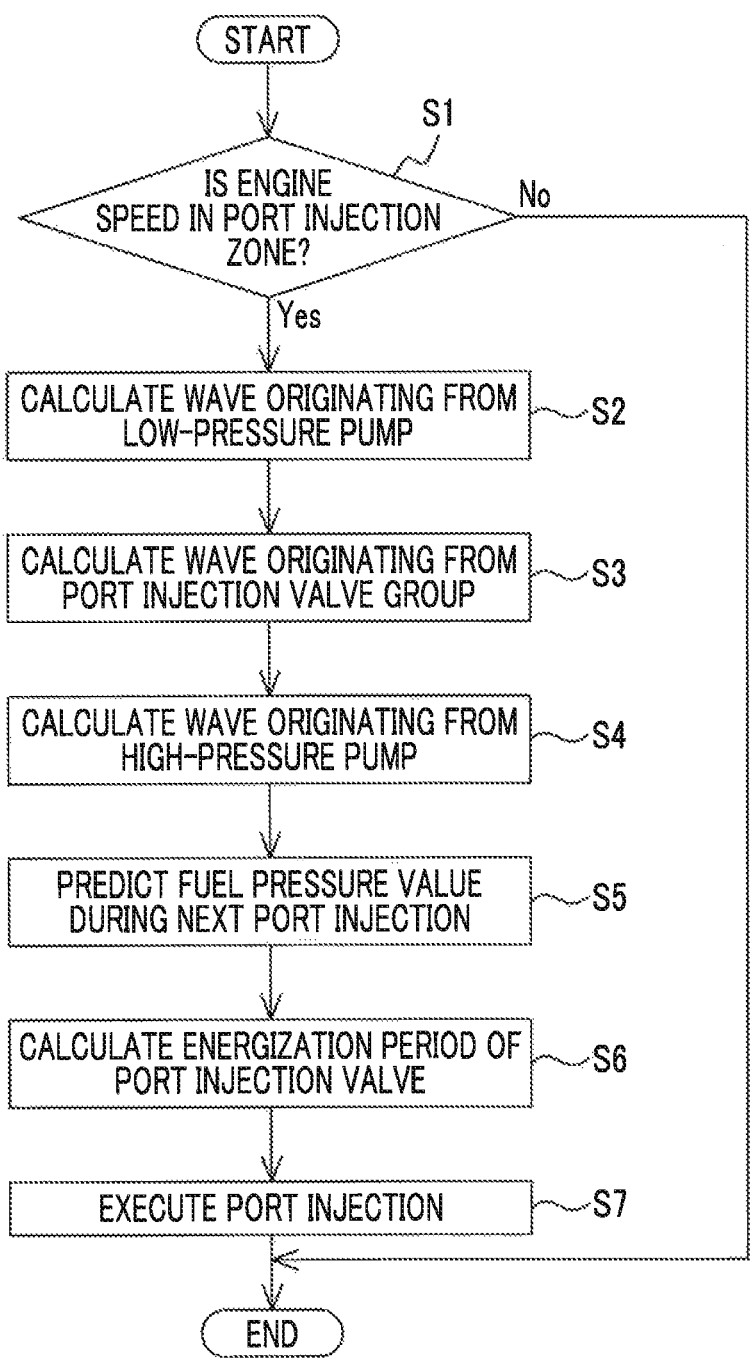
FIG. 5 is a flowchart illustrating an example of port injection control.

Next, the port injection control based on model formula (2) will be described. The ECU 41 calculates the above-described amplitudes $A_1$ to $A_3$, and the like during this port injection control. FIG. 5 is a flowchart illustrating an example of the port injection control. The ECU 41 determines whether or not the engine speed [rpm] calculated on the basis of the crank angle sensor 14a within a port injection zone where the port injection is executed (Step S1). In a case where the determination is negative, this control ends determining that the port injection is not executed. In addition, in this case, the ECU 41 executes fuel injection using the in-cylinder injection valve group 37.

In a case where the determination is positive, the ECU 41 calculates a wave originating from the low-pressure pump 22 in Step S1 (Step S2). That is, an amplitude $A_2$, a vibration frequency $B_2$, and an initial phase $C_2$, and $D_2$ of a wave originating from the low-pressure pump 22 are calculated.

Figure 6A:
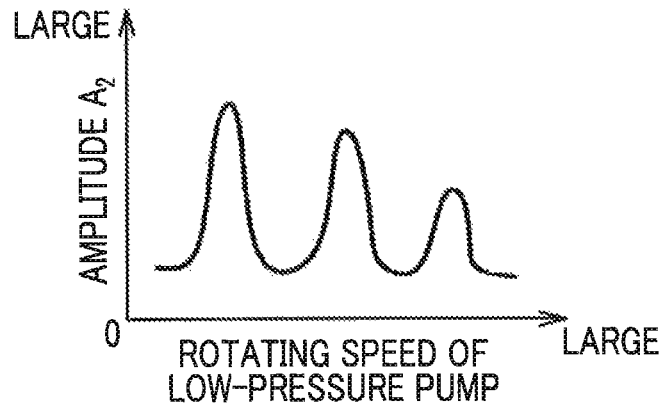
FIG. 6A illustrates an example of a map that defines a relationship between the rotating speed of the low-pressure pump, and amplitude $A_2$.

The amplitude $A_2$ is calculated on the basis of a map that is defined such that the amplitude $A_2$ increases as the rotating speed [rpm] of the low-pressure pump 22 increases. This is because, as the rotating speed of the low-pressure pump 22 is larger, a duty ratio of a driving voltage of the low-pressure pump 22 increases and the amplitude of the wave originating from the rotation of the low-pressure pump 22 increases. FIG. 6A illustrates an example of a map that defines a relationship between the rotating speed of the low-pressure pump 22, and the amplitude $A_2$. This map is calculated by experiments and is stored in advance in the ROM of the ECU 41. In addition, the rotating speed of the low-pressure pump 22 may be calculated on the basis of a sensor that detects the rotating speed of the low-pressure pump 22, or may be calculated on the basis of the duty ratio of the driving voltage of the low-pressure pump 22.

Additionally, the amplitude $A_2$ may be calculated on the basis of a map that is defined such that the amplitude $A_2$ increases as the duty ratio of the driving voltage to the low-pressure pump 22 increases. In addition, the duty ratio of the driving voltage to the low-pressure pump 22 is controlled so as to become smaller as the engine speed and load decrease.

The vibration frequency $B_2$ is equivalent to a periodic number of a duty signal of the driving voltage to the low-pressure pump 22 within a crank angle range of 360 degrees, and decreases as the engine speed [rpm] is larger with respect to the rotating speed [rpm] of the low-pressure pump 22. For this reason, a value obtained by multiplying a ratio of the rotating speed of the low-pressure pump 22 to the engine speed to the periodic number of the duty signal of the driving voltage of the low-pressure pump 22 required for making one rotation of the low-pressure pump 22 is calculated as the vibration frequency $B_2$. Specifically, the vibration frequency $B_2$ is calculated by the following formula (4).

$$B_2 = \text{Periodic number} \times (\text{Rotating speed of low-pressure pump/Engine speed}) \quad (4)$$

In addition, the periodic number of the duty signal required for making one rotation of the low-pressure pump 22 becomes smaller as the rotating speed of the low-pressure pump 22 is larger. For this reason, the ECU 41 counts the periodic number of the duty signal while the low-pressure pump 22 makes one rotation, and calculates the vibration frequency $B_2$ on the basis of the counted value. In addition, the periodic number may be calculated on the basis of a map that is defined such that the above periodic number becomes smaller as the rotating speed of the low-pressure pump 22 is larger.

The initial phase $C_2$ is calculated on the basis of at a crank angle at a timing when the driving voltage of the low-pressure pump 22 is switched from on-duty to off-duty first after the crank angle reaches zero. This is because the pressure of fuel discharged from the low-pressure pump 22 begins to drop if the driving voltage is from on-duty to off-duty.

Figure 6B:
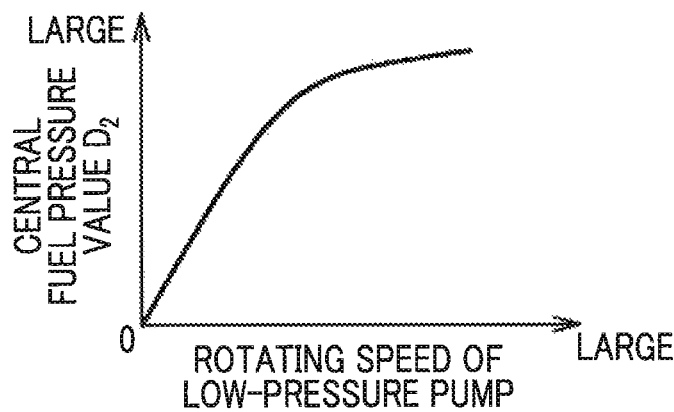
FIG. 6B illustrates an example of a map that defines a relationship between the rotating speed of the low-pressure pump, and central fuel pressure value $D_2$.

The central fuel pressure value $D_2$ is calculated on the basis of a map that is defined such that the central fuel pressure value $D_2$ increases as the rotating speed of the low-pressure pump 22 increases. This is because, as the rotating speed of the low-pressure pump 22 increases, the discharge amount of fuel to the low-pressure fuel line 25 and the low-pressure delivery pipe 26 by the low-pressure pump 22 also increases and the central fuel pressure value $D_2$ also increases. FIG. 6B illustrates an example of a map that defines a relationship between the rotating speed of the low-pressure pump 22, and the central fuel pressure value $D_2$. This map is calculated by experiments and is stored in advance in the ROM of the ECU 41.

The central fuel pressure value $D_2$ may be calculated by methods excluding the above. For example, a target fuel pressure value that is determined according to the operational state of the engine 10 and that is a target value of the fuel pressure within the low-pressure delivery pipe 26 may be calculated as the central fuel pressure value $D_2$. This is because the duty ratio of the driving voltage of the low-pressure pump 22 is feedback-controlled by the ECU 41 such that the detection value of the fuel pressure sensor 28 provided in the low-pressure delivery pipe 26 converges on the target fuel pressure value, and therefore, the central fuel pressure value $D_2$ is controlled so as to converge on the target fuel pressure value.

Additionally, an averaging value obtained by averaging a plurality of detection values of the fuel pressure sensor 28 that detects the fuel pressure within the low-pressure delivery pipe 26 may be calculated as the central fuel pressure value $D_2$. This is because, although the port injection valve group 27 and the high-pressure pump 31 that are factors of the pulsation other than the low-pressure pump 22 do not have the function of maintaining the fuel pressure value within the low-pressure delivery pipe 26 at a predetermined value or higher, the low-pressure pump 22 is always controlled such that the detection values of the fuel pressure sensor 28 converge on the target fuel pressure value as described above. In addition, although the number of times of averaging is 16 times, the number of times is not limited to this.

Next, the ECU 41 calculates a wave originating from the port injection valve group 27 (Step S3). That is, an amplitude $A_3$, a vibration frequency $B_3$, and an initial phase $C_3$, and a central fuel pressure value $D_3$ of the wave originating from the port injection valve group 27 are calculated.

Figure 6C:
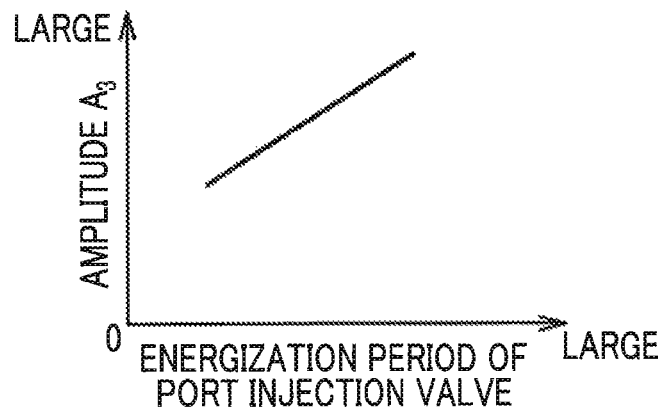
FIG. 6C illustrates an example of a map that defines a relationship between an energization period of the port injection valve, and amplitude $A_3$.

The amplitude $A_3$ is calculated on the basis of a map that is defined such that the amplitude $A_3$ increases as the energization period of an port injection valve, which has performed injection most recently, in the port injection valve group 27 is longer. This is because, as the energization time of the port injection valve is longer, the injection amount increases, the drop amounts of the fuel pressure within the low-pressure fuel line 25 and the low-pressure delivery pipe 26 increases, and the amplitude $A_3$ increases. FIG. 6C illustrates an example of a map that defines a relationship between the energization period of the port injection valve, and the amplitude $A_3$. This map is calculated by experiments and is stored in advance in the ROM of the ECU 41.

The vibration frequency B3 is the number of times of injection of the port injection valve group 27 within a crank angle range of 360 degrees. Here, in the engine 10 of the present embodiment, the four port injection valves 271 to 274 are provided, and the fuel injection is executed from the four port injection valves 271 to 274, respectively, within a crank angle range of 720 degrees. For this reason, the vibration frequency $B_3$ is calculated as 2. In addition, in the case of a single cylinder engine, a 2-cylinder engine, a 3-cylinder engine, a 6-cylinder engine, and an 8-cylinder engine, the vibration frequencies $B_3$ are calculated as 0.5, 1, 1.5, 3, and 4, respectively.

The initial phase $C_3$ is calculated on the basis of a crank angles at an injection start timing of the port injection valve group 27. For example, in the present embodiment, port injection is executed in order of the port injection valves 271, 273, 274, and 272 within respective crank angle ranges of 0 to 180 degree, 180 degrees to 360 degrees, 360 degrees to 540 degrees, and 540 degrees to 720 degrees. Additionally, the crank angle intervals of the start timing of the port injection are regular at 180 degrees. Therefore, in a case where a crank angle at an injection start timing of the port injection valve 271 is acquired, the crank angle at the injection start timing of the port injection valve 271 is calculated as the initial phase $C_3$. In a case where a crank angle at an injection start timing of the port injection valve 273 is acquired, a value subtracted from the acquired crank angle by 180 degrees is calculated as the initial phase $C_3$. In a case where a crank angle at an injection start timing of the port injection valve 274 is acquired, a value subtracted from the acquired crank angle by 360 degrees is calculated as the initial phase $C_3$. In a case where a crank angle at an injection start timing of the port injection valve 272 is acquired, a value subtracted from the acquired crank angle by 540 degrees is calculated as the initial phase $C_3$.

The central fuel pressure value $D_3$ is calculated as zero. This is because, when the port injection valve group 27 is opened by energization as described above, the port injection valve group 27 only injects the high-pressure fuel within the low-pressure delivery pipe 26 into the intake ports 13, and does not have the function of maintaining the fuel pressure value within the low-pressure delivery pipe 26 at a predetermined value or higher.

In addition, immediately after the engine speed has shifted from a region where the port injection is not executed to a region where the port injection is executed, the amplitude $A_3$, the vibration frequency $B_3$, and the initial phase $C_3$ are calculated as zero, determining that the wave originating from the port injection valve group 27 has not occurred yet.

Next, the ECU 41 calculates a wave originating from the high-pressure pump 31 (Step S4). That is, an amplitude $A_1$, a vibration frequency $B_1$, an initial phase $C_1$, and a central fuel pressure value $D_1$ of the wave originating from the high-pressure pump 31 are calculated. In addition, the processings of Steps S2 to S4 are an example of the processing executed by the calculation unit that calculates the amplitudes $A_k$ of the respective waves originating from the plurality of factors that cause the fuel pressure pulsation within the low-pressure fuel line 25 and the low-pressure delivery pipe 26, the vibration frequencies $B_k$ of the respective waves within a crank angle range of 360 degrees, the initial phases $C_k$ of the respective waves, and the central fuel pressure values $D_k$ of the respective waves.

The vibration frequency $B_1$ is equivalent to the number of times of discharge of fuel of the high-pressure pump 31 within a crank angle range of 360 degrees. Here, the number of times of discharge is determined depending on the shape of the cam CP of the high-pressure pump 31. In the case of the present embodiment, since the shape of cam CP is a substantially square shape of which corners were rounded off as illustrated in FIG. 1, the cam CP rotates 180 degrees within a crank angle range of 360, and fuel is discharged twice. Therefore, in the present embodiment, the vibration frequency $B_1$ is calculated as 2. This number of times of discharge is stored in advance in the ROM of the ECU 41.

In addition, in a case where the cam CP has a substantially triangle of which corners are rounded off, the cam rotates 180 degrees per 360-degree crank angle, and the number of times of discharge is 1.5, the vibration frequency $B_1$ is calculated as 1.5. In addition, in a case where the cam CP has a substantially elliptical shape of which corners are rounded off, the number of times of discharge per 360-degree crank angle is 1, and the vibration frequency $B_1$ is calculated as 1.

As for the amplitude $A_1$, a value obtained by subtracting the above-described amplitudes $A_2$ and $A_3$ from an amplitude A calculated by the ECU 41 on the basis of the detection value of the fuel pressure sensor 28 to be described below is calculated as the amplitude $A_1$. Therefore, the amplitude $A_1$ is calculated as $A_1=A-A_2-A_3$. A method of calculating the amplitude A will be described below.

Similarly, as for the initial phase $C_1$, a value obtained by subtracted the above-described initial phases $C_2$ and $C_3$ from an initial phase C calculated on the basis of the detection value of the fuel pressure sensor 28 to be described below is calculated as the initial phase $C_1$. Therefore, the initial phase $C_1$ is calculated as $C_1=C-C_2-C_3$. The calculation of the initial phase C will be described below.

The central fuel pressure value $D_1$ is calculated as zero. As described above, this is because the high-pressure pump 31 is for supplying the high-pressure fuel into the high-pressure fuel pipe 35 and the high-pressure delivery pipe 36 with the upward and downward movement of the plunger 31p, and does not have the function of maintaining the fuel pressure value within the low-pressure fuel line 25 and the low-pressure delivery pipe 26 at a predetermined value or higher.

Next, the ECU 41 predicts the fuel pressure value corresponding to the crank angle during the injection period of the port injection valve scheduled to perform injection next time (Step S5). The fuel pressure value is predicted by the amplitudes $A_1$ to $A_3$, the vibration frequencies $B_1$ to $B_3$, the initial phases $C_1$ to $C_3$, and the central fuel pressure values $D_1$ to $D_3$ calculated in Steps S2 to S4 being substituted in respective items of formula (3). Additionally, a fuel pressure value at an arbitrary crank angles included within a crank angle range corresponding to a period from an injection start timing of a port injection valve that is set in advance depending on the operational state of the engine 10 and is scheduled to perform the next injection to an injection end timing in a case where the port injection is performed in a minimum injection period is predicted on the basis of formula (3). The processing of Step S5 is an example of the processing executed by the prediction unit that predicts a fuel pressure value at an arbitrary crank angle according to Model formula (2) showing the synthesized wave obtained by synthesizing the respective waves on the basis of the amplitudes $A_k$, the vibration frequencies $B_k$, the initial phases $C_k$, and the central fuel pressure values $D_k$ of the respective waves calculated.

The ECU 41 calculates the energization period of the port injection valve scheduled to perform the next injection on the basis of the predicted fuel pressure value such that fuel is injected by a required injection amount set according to the operation requirement of the engine 10 (Step S6). Specifically, an energization period $\tau$ [ms] is calculated according to the following formula (5).

$$\tau = (Q/Q_{INJ}) \times \sqrt{P_0/P(\theta)} \times 60 \times 1000 \tag{5}$$

Q [mL] is the required injection amount. $Q_{INJ}$ [mL/min] is respective nominal flow rates of the port injection valves 271 to 274. $P_0$ [kPa] is inspection pressures corresponding to the respective nominal flow rates of the port injection valves 271 to 274. $Q_{INJ}$ and $P_0$ are calculated in advance by experiments and are stored in the ROM. $P(\theta)$ [kPa] is the fuel pressure value predicted according to formula (3). The processing of Step S6 is an example of the processing executed by an energization period calculation unit that calculates the energization period of the port injection valve on the basis of the predicted fuel pressure value such that the port injection valve perform injection by the required injection amount Q.

Next, in a case where the crank angle at this point of time reaches the injection start timing of the next port injection valve, the ECU 41 issues a command to the driver circuit 42, energizes the port injection valve scheduled to perform injection during the calculated energization period, and executes the port injection (Step S7).

As described above, the fuel pressure value is predicted according to formula (3) in which the plurality of factors of pulsation are taken into consideration, and the energization period of the port injection valve is calculated on the basis of the predicted fuel pressure value. For this reason, the fuel injection amount of the port injection valve can be precisely controlled, and the air-fuel ratio can be precisely controlled. In addition, the order of processing Step S2 and S3 does not matter. Additionally, the order of calculation of the amplitudes $A_2$ and $A_3$, the vibration frequencies $B_2$ and $B_3$, the initial phases $C_2$ and $C_3$, the central fuel pressure values $D_2$ and $D_3$ does not matter.

Next, the method of calculating the above-described the amplitude A will be described. The following formula (6) and formula (7) is established if a detection value of the fuel pressure sensor 28 acquired this time by the ECU 41 is $P_n$, a previous detection value acquired immediately before the detection value $P_n$ is acquired is as $P_{n-1}$, and crank angles at points of time when the detection values $P_n$ and $P_{n-1}$ are acquired $\theta_n$ and $\theta_{n-1}$, respectively.

$$P_n = A \cos\{B(\theta_n - C)\} \tag{6}$$

$$P_{n-1} = A \cos\{B(\theta_{n-1} - C)\} \tag{7}$$

The central fuel pressure values are not included in formulas (6) and formula (7). This is because there is no influence on the calculation of the amplitude A and the initial phase C even if the central fuel pressure values are regarded as zero.

Here, if $\theta_n - \theta_{n-1} = \theta_{AD}$ [deg] is established, the amplitude A can be expressed as following formula (8) on a basis of formula (6) and formula (7).

$$A = \sqrt{\frac{(P_{n-1} \cdot \cos\theta_{AD} - P_n)^2}{\sin^2\theta_{AD}} + P_{n-1}^2} \tag{8}$$

In this way, the amplitude A is calculated on the basis of the detection values $P_{n-1}$ and $P_n$ and the crank angle $\theta_{AD}$.

Next, a method of calculating the above-described initial phase C will be described. The ECU 41 calculates two candidates $C^+$ and $C^-$ for the initial phase C on a basis of the following formula (9) calculated on a basis of formula (8) and formula (6).

$$C = \theta_n \pm \left\{ \cos^{-1}\left(\frac{P_n}{A}\right) \cdot \frac{1}{B} \right\} \tag{9}$$

Here, $C^+ = \theta_n + \{\cos^{-1}(P_n/A) \times (1/B)\}$ and $C^- = \theta_n - \{\cos^{-1}(P_n/A) \times (1/B)\}$ are established. In addition, in Formula (9), the crank angle $\theta_{n-1}$ and the detection value $P_{n-1}$ may be used instead of the crank angle $\theta_n$ and the detection value $P_n$. Even in this case, the value of the initial phase C becomes the same value theoretically.

Here, a true solution of the initial phase C is determined on the basis of the following formula (10).

$$|P_{n-1} - \{A \cos\{B(\theta_{n-1} - C^+)\} + D_2\}| < \varepsilon \tag{10}$$

$A \cos\{B(\theta_{n-1} - C^+)\} + D_2$ on the left side of formula (10) means a temporary fuel pressure value calculated on the basis of the above-described candidate $C^+$. Here, the vibration frequency B is a value obtained by adding up the vibration frequencies $B_1$, $B_2$, and $B_3$. A predetermined value $\varepsilon$[kPa] is a slightly larger value than a largest error required between the temporary fuel pressure value and the detection value $P_{n-1}$ in a case where the true solution of the initial phase C is candidate $C^+$, is calculated in advance by experiments and is stored in the ROM. In a case where Formula (10) is established, the candidate $C^+$ is identified as the initial phase C, and in a case where formula (10) is not established, the ECU 41, specifies the candidate $C^-$ as the initial phase C.

In addition, in formula (10), a sign of inequality may be reversed. In this case, in a case where formula (10) is established, the candidate $C^+$ is identified as the initial phase C, and in a case where formula (10) is not established, the candidate $C^-$ as the initial phase C. Additionally, in formula (10), the candidate $C^-$ may be used instead of the candidate $C^+$. Even in this case, in a case where formula (10) is established, the candidate $C^+$ is identified as the initial phase C, and in a case where formula (10) is not established, the candidate $C^-$ is identified as the initial phase C. Additionally, in formula (10), the detection value $P_n$ and the crank angle $\theta_n$ may be used instead of the detection value $P_{n-1}$ and the crank angle $\theta_{n-1}$.

In addition, in the above embodiment, the high-pressure pump 31, the low-pressure pump 22, and the port injection valve group 27 are exemplified as the plurality of factors of pulsation. However, the factors are not limited to these. For example, in a case where a new mechanism that becomes a factor of pulsation is added to the control device 1 of the present embodiment, the fuel pressure value can be predicted by calculating the amplitude $A_4$, the vibration frequency $B_4$, the initial phase $C_4$, and the central fuel pressure value $D_4$ of a wave originating from the mechanism.

Next, prediction of the fuel pressure value using a simple technique will be described. In the above, the fuel pressure value is predicted by calculating the amplitudes $A_1$ to $A_3$, the vibration frequencies $B_1$ to $B_3$, the initial phases $C_1$ to $C_3$, and the central fuel pressure values $D_1$ to $D_3$ of the three waves. However, the fuel pressure value may be predicted by a simple method as follows, without taking into consideration a wave originating from a factor with a small influence on pulsation.

Since the cycle of the wave originating from the low-pressure pump 22 is longer than the cycle of the wave originating from the other factors, the amplitude $A_2$ excluding the central fuel pressure value $D_2$, the vibration frequency $B_2$, and the initial phase $C_2$ of the wave originating from the low-pressure pump 22 can be regarded as zero. Additionally, since the amplitude $A_3$ of the wave originating from the port injection valve group 27 is relatively smaller than the amplitude $A_1$ and the amplitude $A_2$ of the other waves, the amplitude $A_3$, the vibration frequency $B_3$, and the initial phase $C_3$ can be regarded as zero. Additionally, since the central fuel pressure values $D_1$ and $D_3$ are zero as already described above, formula (3) can be expressed as following formula (11).

$$P(\theta) = A_1 \cos\{B_1(\theta - C_1)\} + D_2 \quad (11)$$

Since $A = A_1$ is established in a case where amplitudes $A_2$ and $A_3$ are zero as described above, the amplitude $A_1$ can be calculated on the basis of the above-described formula (8). Additionally, since $C = C_1$ is established in a case where the initial phases $C_2$ and $C_3$ are zero, the initial phase $C_1$ can be calculated on a basis of the above-described formula (9) and formula (10).

In this way, since the fuel pressure value can be predicted by the simple technique, an increase in the calculation load of the ECU 41 accompanying the prediction of the fuel pressure value can be suppressed. Additionally, the prediction of the fuel pressure value by such a simple technique is suitable in a case where control of a control target controlled on the basis of the predicted fuel pressure value is not required with high precision.

In addition, although the waves originating from the high-pressure pump 31 and the low-pressure pump 22 are taken into consideration, the amplitude $A_3$, the vibration frequency $B_3$, and the initial phase $C_3$ of the wave originating from the port injection valve group 27, may be regarded as zero, and the fuel pressure value may be predicted.

Additionally, although the waves originating from the high-pressure pump 31 and the port injection valve group 27 are taken into consideration, the amplitude $A_2$, the vibration frequency $B_2$, and the initial phase $C_2$ excluding the central fuel pressure value $D_2$ of the wave originating from the low-pressure pump 22 may be regarded as zero, and the fuel pressure value may be predicted.

Although the embodiment of the present disclosure has been described above in detail, the present disclosure is not limited to the relevant specific embodiment, and various alterations and changes can be made within the scope of the present disclosure described in the claims.

What is claimed is:

1. A control device for an internal combustion engine, the control device comprising:
   an in-cylinder injection valve configured to directly inject fuel into a cylinder of the internal combustion engine;
   a port injection valve configured to inject fuel into an intake port of the internal combustion engine;
   a low-pressure pump configured to pressurize fuel;
   a low-pressure fuel passage configured to supply the fuel pressurized by the low-pressure pump to a plurality of the port injection valves;
   a high-pressure pump configured to be driven in an interlocking mariner with the internal combustion engine and further pressurize the fuel supplied from the low-pressure fuel passage;
   a high-pressure fuel passage configured to branch from the low-pressure fuel passage and supply the fuel pressurized by the high-pressure pump to a plurality of the in-cylinder injection valves;
   a crank angle sensor configured to detect a crank angle of the internal combustion engine; and
   an electronic control unit configured to:
   i) calculate amplitudes of respective waves, respectively, originating from a plurality of factors that generate fuel pressure pulsation within the low-pressure fuel passage, vibration frequencies of the respective waves within a crank angle range of 360 degrees, initial phases of the respective waves, and central fuel pressure values of the respective waves,
   ii) predict a fuel pressure value at an arbitrary crank angle according to a following model formula showing a synthesized wave obtained by synthesizing the respective waves, on a basis of the amplitudes, the vibration frequencies, the initial phases, and the central fuel pressure values of the respective waves calculated, $$P(\theta) = \sum_{k=1}^{n} A_k \cos\{B_k(\theta - C_k)\} + D_k$$

where P is a fuel pressure value of the synthesized wave corresponding to the crank angle, $\theta$ is the crank angle, $A_K$ is the amplitudes of the respective waves, $B_k$ is the vibration frequencies of the respective waves within the crank angle range of 360 degrees, $C_k$ is the initial phases of the respective waves, $D_k$ is the central fuel pressure values of the respective waves, and
   iii) calculate an energization period of the port infection valve on a basis of the predicted fuel pressure value such that the port injection valve performs injection by a required injection amount.

2. The control device according to claim 1, wherein the electronic control unit is configured to calculate the amplitudes, the vibration frequencies, the initial phases, and the central fuel pressure values of respective waves, respectively, originating from the high-pressure pump, the low-pressure pump and the port injection valves.

3. The control device according to claim 2, wherein the electronic control unit is configured to:
   i) perform calculation such that one of the amplitudes of the respective waves originating from the low-pressure pump increases as a rotating speed of the low-pressure pump increases;
   ii) calculate, as one of the vibration frequencies of the respective waves originating from the low-pressure pump, a value obtained by multiplying a ratio of the rotating speed of the low-pressure pump to a rotating speed of the internal combustion engine by a periodic number of a duty signal of a driving voltage of the low-pressure pump required for rotating the low-pressure pump; and
   iii) calculate one of the initial phases of the respective waves originating from the low-pressure pump on a basis of the crank angle at a timing when the driving voltage of the low-pressure pump is switched from on-duty to off-duty first after the crank angle reaches zero.

4. The control device according to claim 2, wherein the electronic control unit is configured to:
   i) perform calculation such that one of the amplitudes of the respective waves originating from the port injection valve increases as an energization period of the port injection valve from which fuel is most recently injected is long; and
   ii) calculate one of the initial phases of the respective waves originating from the port injection valve, on a basis of the crank angle at a injection start timing of the port injection valve.

5. The control device according to claim 2, wherein the electronic control unit is configured to:
   i) calculate the central fuel pressure values originating from the high-pressure pump and the port injection valve, respectively, as zero; and
   ii) calculate one of the central fuel pressure values of the respective waves originating from the low-pressure pump, on a basis of any of a rotating speed of the low-pressure pump, an averaging value of a detection value of a fuel pressure sensor that detects a fuel pressure value within the low-pressure fuel passage, and a target fuel pressure value that is a target value of the fuel pressure value within the low-pressure fuel passage.

* * * * *